Dec. 24, 1929.  F. DIEHL  1,740,972
MACHINE FOR TRIMMING VENEER
Filed Jan. 23, 1928  4 Sheets-Sheet 1

Inventor
Frank Diehl
By

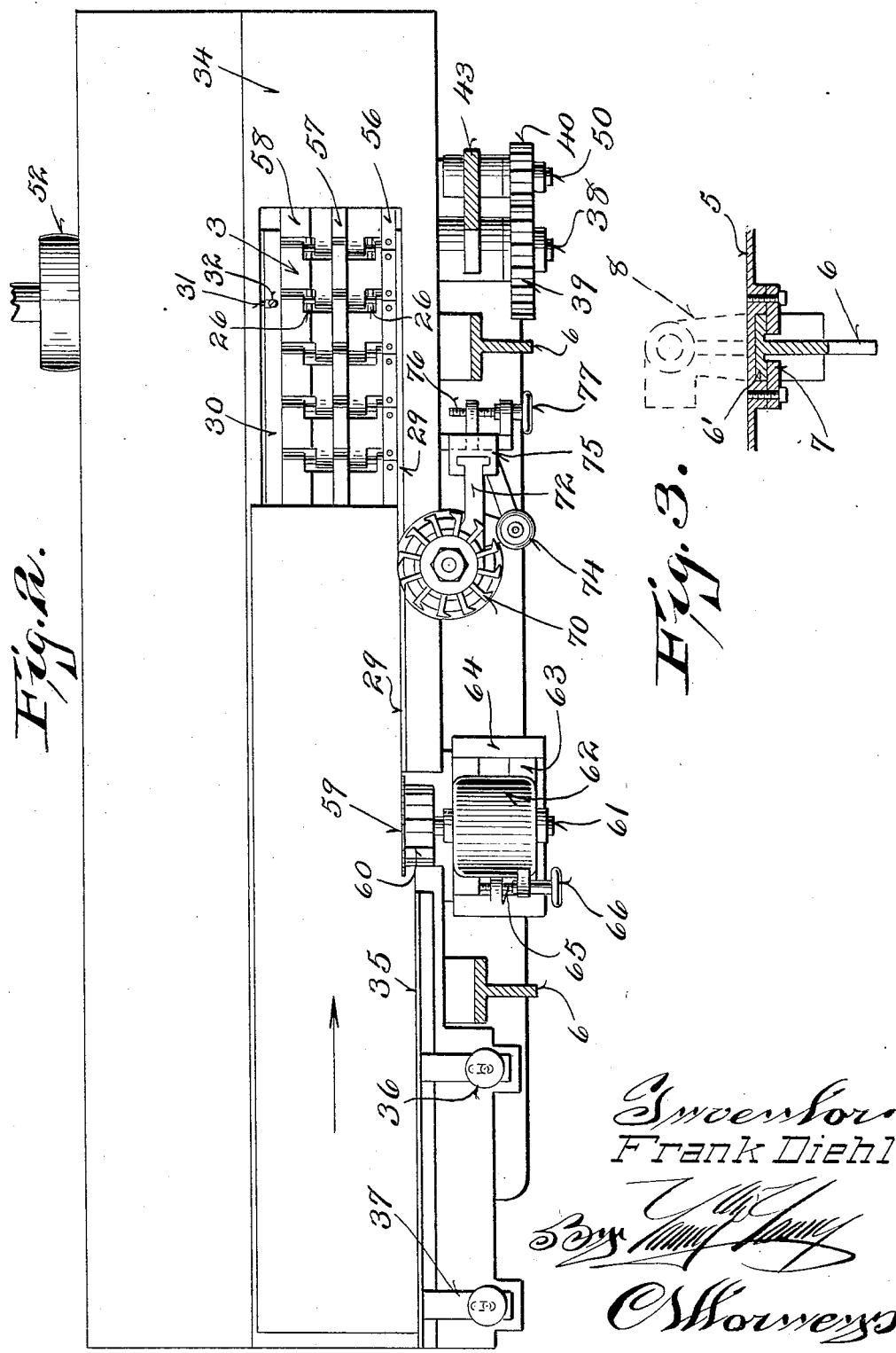

Dec. 24, 1929.                F. DIEHL                    1,740,972
                      MACHINE FOR TRIMMING VENEER
                      Filed Jan. 23, 1928        4 Sheets-Sheet 3

Inventor
Frank Diehl

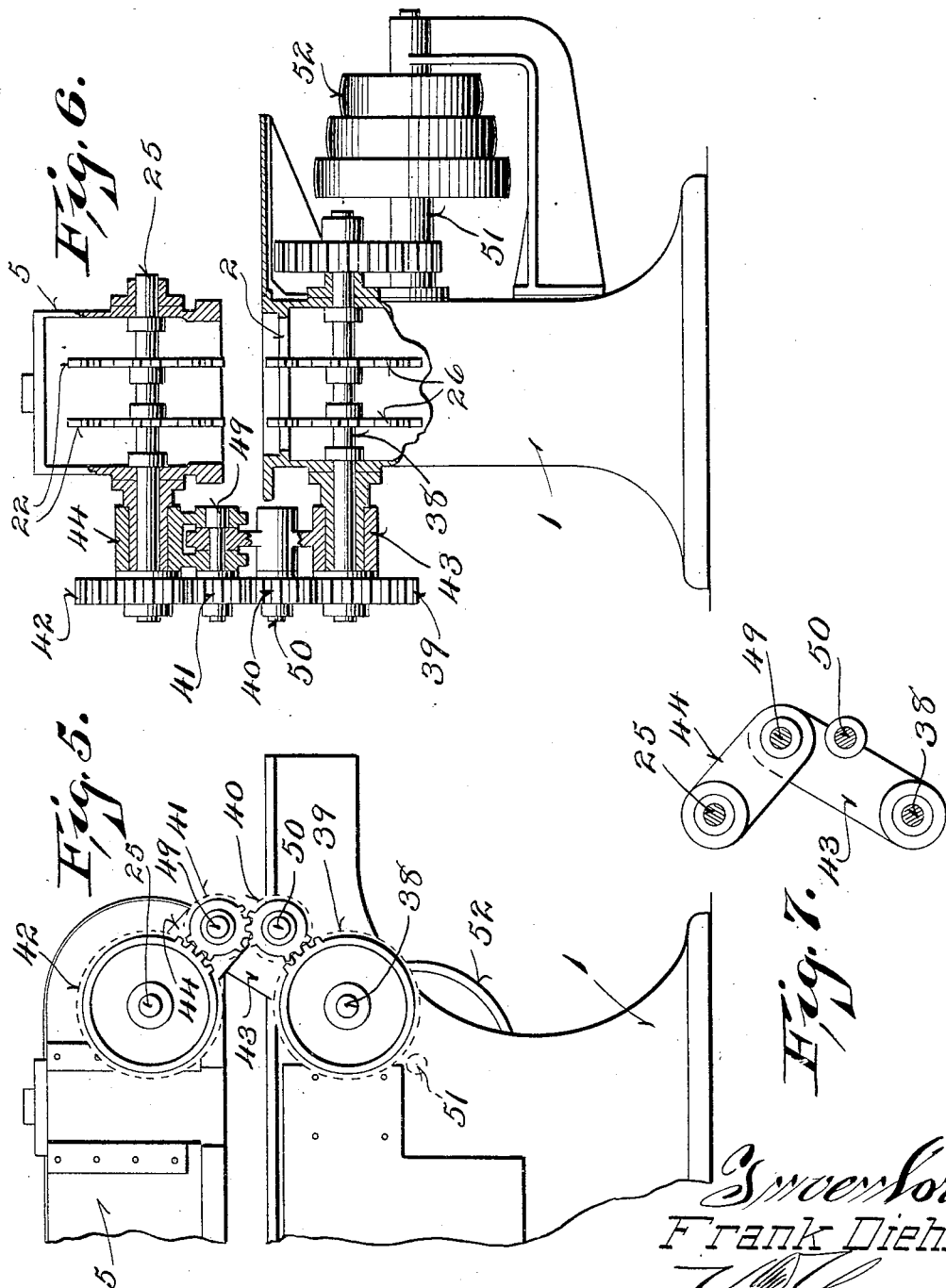

Patented Dec. 24, 1929

1,740,972

UNITED STATES PATENT OFFICE

FRANK DIEHL, OF WABASH, INDIANA

MACHINE FOR TRIMMING VENEER

Application filed January 23, 1928. Serial No. 248,692.

This invention relates to a machine for trimming veneer.

It is well known that great difficulty has been experienced in trimming veneer due to a variety of causes, among the most prominent of which is the spreading of the veneer due to the fact that it is curled and warped in numberless directions so that when it is held clamped it expands unequally with consequent irregular edges. Further, it is impossible, as found by actual tests to grip a stack of buckled or warped veneer sheets between two flat faces and compress them to a compact even body.

Another cause is due to the fact that the veneer does not always have the grain run in the same direction but that it is extremely irregular, some of the sheets having the grain running at widely different angles from the grain in the other sheets.

A further cause of this difficulty is due to the fact that the veneer is extremely thin and is readily split, chipped, or torn, by the trimming means.

This invention is designed to provide a machine which overcomes all of the difficulties enumerated above and which is so constructed that its operation is not interfered with by any one of the characteristics of the veneer sheets, but in which the machine clamps the veneer rigidly in a stack of sheets, irrespective of the warping of the sheets and in which the "give" due to the warping or bowing of the several sheets, is allowed for in the clamping means so that a tight sheet to sheet contact is maintained adjacent the edge being trimmed, and in which the trimmed edge is rigidly clamped throughout its length while passing through the machine, thus preventing splitting, tearing, or chipping of the veneer, irrespective of the angle at which the grain may run, and irrespective of the fact that the grain in the successive sheets forming the stack may run at widely different angles.

Further objects are to provide a veneer trimming machine which is so constructed that there is no relative shifting of the successive sheets, but in which all of the sheets travel as a single body or unit continuously throughout the machine in a uniform manner without any relative shifting whatsoever.

Further objects are to provide a machine which trims the edge of the veneer in a novel manner removing the major portion of the veneer by sawing and milling or cutting away the sawed portion and thereafter by milling or accurately cutting away a slight amount of the substantially straight edge, thus giving a perfectly true straight and smooth edge for the veneer sheets.

Further objects are to provide a machine in which a stack of veneer sheets are adapted to be clamped by travelling belts and in which the belts are yieldingly pressed towards each other and are composed of non-extensible members in the nature of a chain, and in which the clamping faces of the belts or chains are so made that they cause the veneer sheets or stack to securely bear against the guide so that there is no pulling away of the sheets of veneer from the guide while the sheets are passing through the machine.

Further objects are to provide a machine in which provision is made for bodily adjusting the upper belt or chain and in which widely varying thicknesses of the pile of veneer sheets may be handled.

A further object of this invention is to provide a veneer trimming machine which is continuous in its operation, that is to say, in which successive stacks of veneer sheets may be fed one after the other continuously through the machine, thus permitting the machine to accomplish a large amount of work in a given time.

Further objects are to provide a machine in which the upper chain or belt is supported whether or not material is positioned between the belts so that there is no extension of the upper belt which would cause shifting of subsequently received stacks of veneer sheets, and to provide means for taking up wear in the bottom chain guides so that the maximum precision or accuracy for the finishing cutter is obtained.

An embodiment of the invention is shown in the accompanying drawings in which:

Figure 2 is a sectional view on the line 2—2 of Figure 1;

Figure 3 is a sectional view on the line 3—3 of Figure 4;

Figure 5 is a fragmentary view of one end of the machine;

Figure 6 is a sectional view through the machine adjacent the end shown in Figure 5;

Figure 7 is a detail of the links carrying the connecting idler gears for driving the upper belt or chain and shows the links illustrated in Figure 5 with the gears removed.

Figure 1:
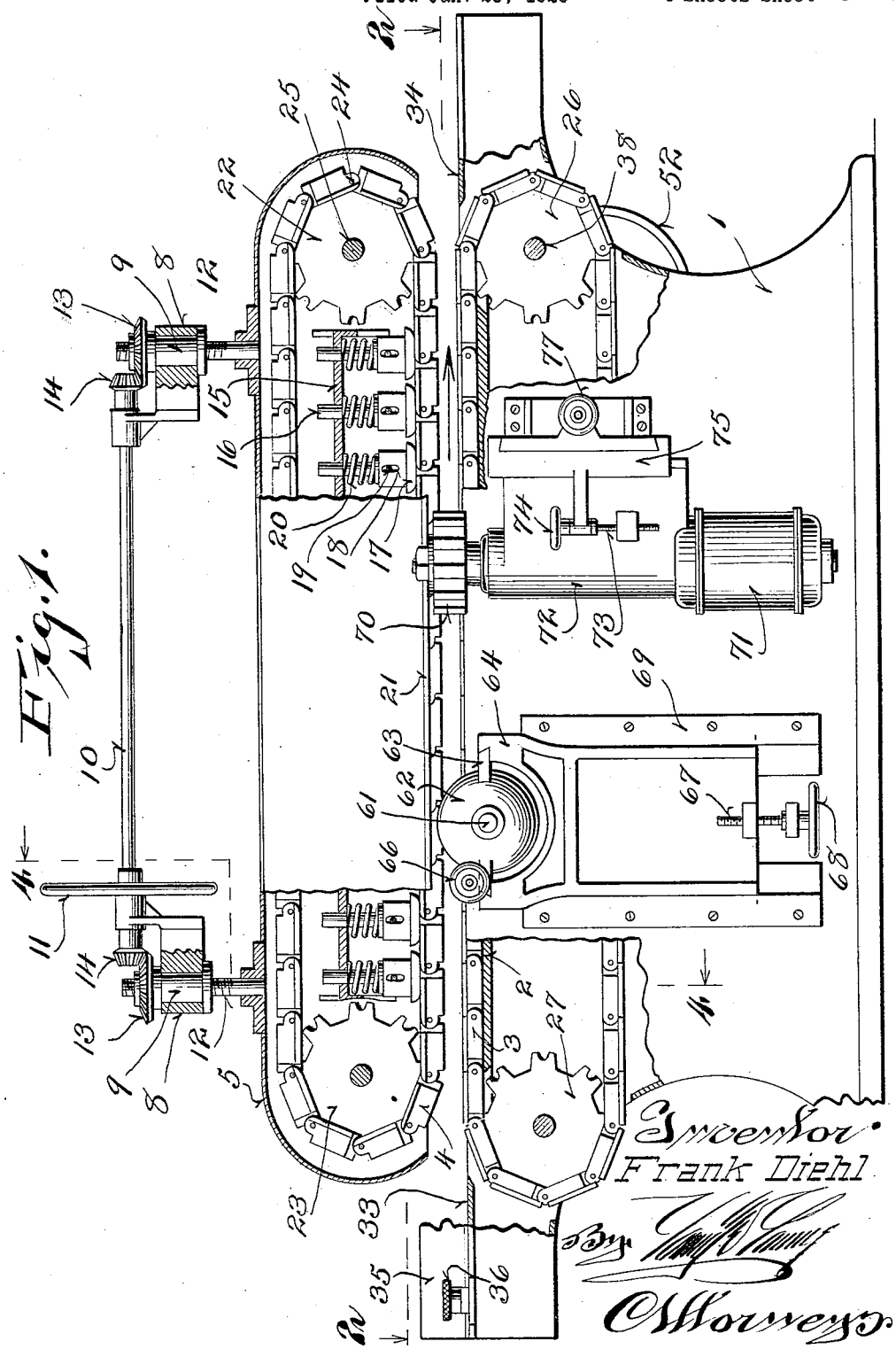
Figure 1 is a rear elevation of the machine with parts broken away.
Figure 4:
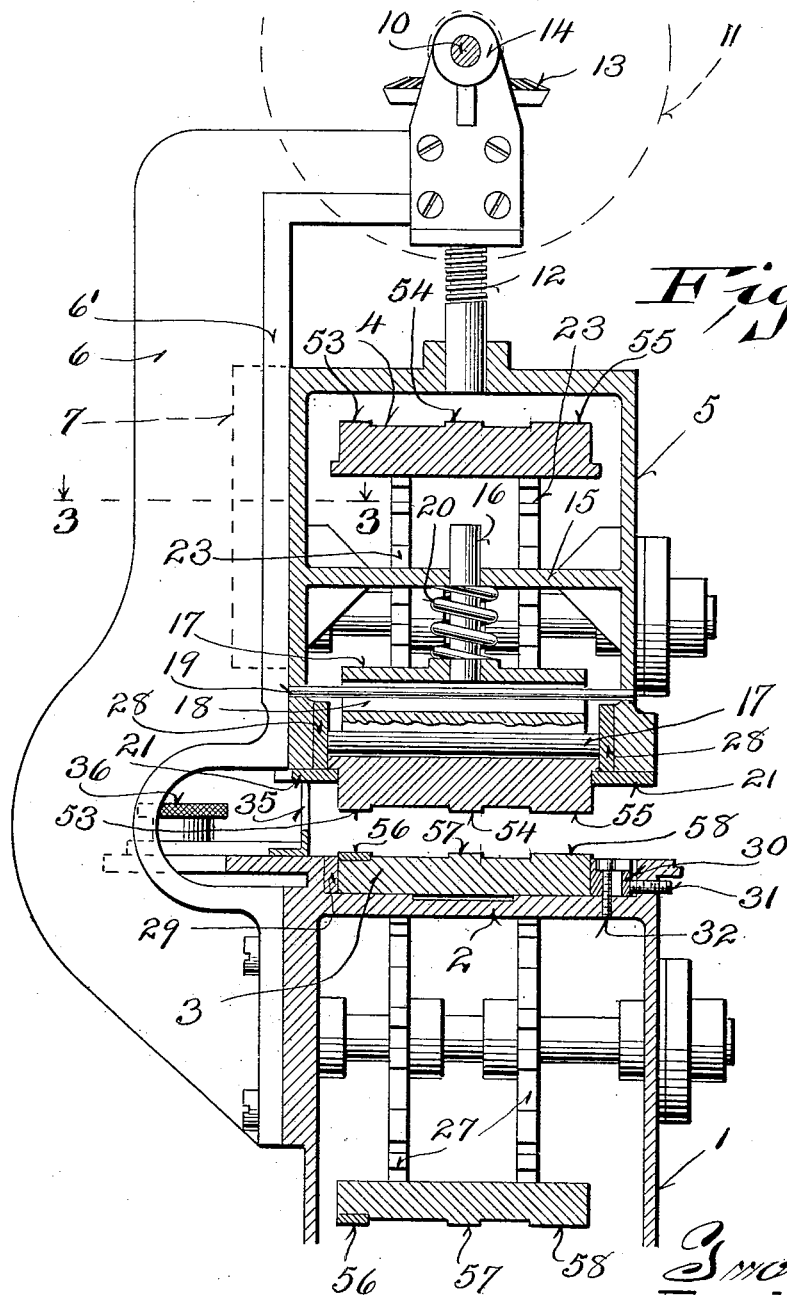
Figure 4 is a sectional view on the line 4—4 of Figure 1.

Referring to the drawings, it will be seen that the machine comprises a base 1 which is provided with a bed plate 2 upon which the lower chain 3 is supported. An upper chain 4 cooperates with the lower chain to clamp stacks of veneer sheets between them. This upper chain is carried by an adjustable head 5 which is a hollow, roughly rectangular structure. The base 1 carries a pair of webbed brackets 6 (see Figures 1 and 2). These brackets extend upwardly and form guides upon which the head 5 is carried, as developed most clearly in Figure 3. Preferably, the head 5 is provided with channel portions which fit the projecting flanges 6' of the bracket 6 and which are held to such flanges by means of the plates or strips 7. The brackets 6 have overhanging portions 8, as shown in Figures 1, 3, and 4. These portions 8 form bearings for revoluble nuts 9 and for the hand wheel shaft 10, such shaft being provided with a hand wheel 11 for adjusting the head 5, as will immediately appear. The head 5 is provided with a pair of rigidly carried threaded pins or screws 12 which are threaded through the revoluble nuts 9. The upper ends of the nuts are provided with bevel gears 13 which mesh with the bevel pinions 14 carried by the hand wheel shaft 10, as shown in Figure 1, so that by revolving the hand wheel the simultaneous adjustment of both ends of the head 5 is obtained and consequently the upper chain 4 is maintained parallel to the lower chain under all conditions of adjustment.

The head 5 is provided with an internally located web 15 (see Figure 1) through which the pins 16 of spring pressed shoes 17 project. The heads of the shoes are provided with slots 18 guided by means of pins 19 secured to the head 5. Springs 20 are interposed between the heads of the shoes or pressure members and the web 15, as shown in Figure 1. The ends of the shoes are rounded so as to freely slide over the bottom stretch of the upper chain 4 and to exert a yielding pressure upon such chain with the pressure distributed throughout the active length or stretch of such chain. This construction is illustrated in considerable detail in Figure 4, from which it will be seen that the upper chain has projecting ears which rest upon the guiding plates or strips 21 so as to prevent the chain from sagging downwardly irrespective of whether or not work is positioned between the chains. The upper chain is carried by front and rear sprocket wheels 22 and 23, as shown in Figure 1, and these sprocket wheels are provided with notched teeth which engage the pintle pins 24 of the successive links.

From the description thus far given, it will be seen that the upper chain and the mechanism therefor are completely housed in the upper head.

The sprocket wheel 22 is the driving wheel for the upper chain, as will appear hereinafter. This sprocket wheel is carried by a shaft 25.

The lower chain is carried by sprocket wheels 26 and 27. The sprocket wheel 26 is the driving sprocket wheel for the lower chain and it will be seen from the direction of travel, as indicated by the arrow in Figure 1 that both chains are pulled under tension throughout their active stretches and also it will be seen that these active stretches are held in parallelism.

It is to be noted also particularly from Figure 4 that the upper chain is guided by means of gibs 28 and that the lower chain is guided by means of a stationary gib 29 and an adjustable gib 30. The adjustable gib is adjusted by means of the set screws 31 and clamped in place by means of the screws 32. The reason for the construction of guiding means for the chains will appear hereinafter, but it will be seen from the description thus far given that absolute precision in the guiding of the chains is obtained.

It is to be noted also from Figure 1 that the base 1 is provided with a feeding table 33 and a discharge table 34. Further, from reference to Figure 2, it will be seen that the machine is provided with a guide 35 adjustably locked by means of the hand screws or clamping screws 36. Preferably, the guide 35 is provided with slotted projections 37 through which the threaded shanks of the screws pass (see Figure 2).

The means for driving the upper and lower chains will now be described.

It will be noted from Figure 1 that the sprocket wheel 26 of the lower chain is carried by a shaft 38. This shaft 38 projects through the rear face of the machine and is provided with a gear 39. The gear 39 meshes with an idler gear 40 which in turn meshes with an idler gear 41. The idler gear 41 meshes with a gear 42 rigid upon the shaft 25, as shown most clearly in Figure 5. It is to be noted that the gears 40 and 41 are carried by a long link 43 and a short link 44 (see Figures 5 and 7). The links are pivotally joined at the shaft 49 upon which the idler gear 41 is carried and the free ends are pivotally mounted upon the shafts 38 and 25. Further, it is to be noted that the link 43 carries a pin or shaft 50 upon which the gear 40 is mounted. Thus, it will be seen that irrespective of the adjustment of the head that the upper and lower chains will be positively connected through the gearing and sprocket wheels so that they will move when driven by the mechanism hereinafter described in absolute step or perfect unison with each other, and shifting of the stack of veneer sheets will not occur.

The means for driving the chains may comprise any suitable source of power, for example, a driven shaft 51 (see Figure 6) may be provided with a cone pulley 52. This driven shaft 51 is connected by means of gearing with the shaft 38, as shown in Figure 6.

It is to be noted from Figure 4 that the upper chain is provided with bearing feet or faces 53, 54, and 55. Further, from this figure, it will be seen that the lower chain is provided with bearing feet 56, 57, and 58. These bearing feet are directly opposite each other and are spaced in a peculiar manner, as will be noted from Figure 4. Preferably, the bearing feet 53 and 56 and the bearing feet 54 and 57 are of the same size and are spaced somewhat widely apart. The bearing feet 55 and 58 are wider and are not spaced as far from the bearing feet 54 and 57 as the spacing of the first mentioned bearing feet. Preferably, the bearing feet 56 are formed of separate plates removably secured to the corresponding links of the lower chain, as shown in Figure 2. They are also preferably hardened, although this may not always be required in all types of machines. At all events, they abut at their ends when the links are horizontal, as shown in Figure 2, thus providing a continuous edge or bearing rib throughout the entire active stretch of the lower chain. The purpose of this mode of forming the sheets and their relative size and spacing will appear when the operation of the machine is given hereinafter.

A cutter 59 in the form of a saw is positioned as shown in Figure 2 and is rigidly connected to a milling cutter 60. This composite cutter is carried by the shaft 61 of an electric motor or other suitable source of power 62. The electric motor is carried upon a plate 63 which is guided for horizontal sliding within a vertically adjustable frame or cross head 64. The members 63 in reality form a horizontally adjustable cross head and permit horizontal adjustment of the composite cutter by means of the screw 65 operated from the hand wheel 66, as shown in Figure 2. The vertical adjustment of the cross head or frame 64 is obtained by means of the screw 67 (see Figure 1) operated from the hand wheel 68. The cross head 64 is carried in guides 69 secured to the base 1 of the machine, as shown in Figure 1.

A second or finishing cutter 70 in the form of a milling cutter is provided. This cutter has its axis arranged vertically and is driven by an electric motor or other source of power 71. The cutter is carried by a vertically adjustable cross head 72 whose adjustment is controlled by the screw 73 operated by the hand wheel 74. The vertically slidable cross head 72 is carried by a horizontally slidable cross head 75 (see Figures 1 and 2) whose position is controlled by the screw 76 operated by the hand wheel 77. It is to be noted that the gib 29 is cut out adjacent the finishing cutter 70, as shown in Figure 2, so that the cutter teeth operate in very close proximity to the bearing ribs or feet 56 of the lower chain and thus a very accurate finishing cut is obtained.

In operating the machine, a stack of veneer sheets are placed upon the table and are slid into the machine so that their front edges rest upon the lower belt 3. From Figure 1, it will be seen that the lower belt has a flat operative stretch in advance of the position where the stack is gripped by the upper belt. Consequently, a very small travelling table is continuously formed by this portion of the lower belt. The work is held against the guide 35 and slid into position between the belts. The belts or chains thereafter grip the work tightly between them and hold the stack firmly in place.

The individual sheets are separately curled and warped and it has been found from numerous experiments that continuous flat belts or chains do not accurately hold the work. The reason for this is that when the stack is compressed no provision is made for accommodating the sheets when their bulged portions are flattened out. However, with this invention, the stack of sheets is gripped at separate points by the feet or bearing faces 53 to 58 (see Figure 4). These bearing feet of the belts or chains are spaced apart and allow for the shifting of the actual body of the veneer sheets in the spaces between these feet while holding the veneer sheets rigidly at the separate points.

The purpose of having the feet 55 and 58 larger and more closely spaced to the adjacent feet, is that more flattening is produced in a greater extent of the area of the strips at this side of the machine and consequently this edge of the strips is elongated to a slight extent. This causes the strips to bear against the guide 35 as is apparent from a consideration of Figures 2 and 4. This result has been obtained after extended experiments with gripping stacks of veneer sheets and at once obtains both of the desirable results of holding the stack very firmly in place against shifting and also in holding the stack continuously against the guide 35. Another stack of veneer strips is placed upon the table and slid into abutting relation with the stack being fed through the machine so that the operation of the machine is continuous.

The stack of veneer sheets meets the first cutter and is sawed or trimmed by the cutter saw 59. The projecting portions are milled away by the cutter 60 of this first composite cutter. Thereafter, a very fine trimming cut is made by the second cutter 70, and consequently a highly finished, accurate edge is produced. This finishing cutter operates very close to the feet or pressure ribs 53 and 56 of the belts and inasmuch as the veneer strips are very tightly gripped at this point no slipping whatsoever can occur and the cutting takes place without breaking or nicking the sheets, although there may be great differences in the angle at which the grain runs.

The gibs 28, 29 and 30 hold the chains accurately in position and consequently the finishing cutter can operate very close to the edge of the chains. The feet 56 form a continuous ridge so that all portions of the front marginal part of the stack of veneer sheets is supported throughout the entire length of the stack.

It will be seen that a veneer trimming machine has been produced which is absolutely accurate in its work, which will take the warped stack of veneer sheets and hold them accurately in place while the cutting progresses.

Further, it will be seen that there is no chance of producing a ragged edge, but that the machine continuously turns out accurately trimmed veneer sheets.

Although the invention has been described in considerable detail, such description is intended as illustrative rather than limiting as the invention may be variously embodied and as the scope of such invention is to be determined as claimed.

I claim:

1. A veneer trimming machine comprising a pair of endless chains having projecting portions forming spaced feet arranged opposite each other, said chain having straight stretches adapted to receive a stack of veneer sheets between them, a table, a guide carried by said table adjacent one edge of said chains and against which the stack of sheets are adapted to bear, the projecting portions of the chains being more closely spaced away from said guide than on the side towards said guide, whereby said stack is caused to hug said guide, and trimming means arranged beyond said guide for trimming an edge of said stack.

2. A veneer trimming machine comprising a pair of endless chains adapted to receive veneer sheets between them, said chains each having a plurality of longitudinally spaced projecting gripping portions adapted to engage the veneer sheets at spaced points to allow the sheets to bulge between the gripped portions, one of the projecting gripping portions on one of the chains being removably secured thereto, and means for trimming the edges of the veneer sheets.

3. A veneer trimming machine comprising a pair of endless chains having projecting portions forming spaced feet arranged opposite each other, said chain having straight stretches adapted to receive a stack of veneer sheets between them, a table, a guide carried by said table adjacent one edge of said chains and against which the stack of sheets are adapted to bear, the projecting portions of the chains being more closely spaced away from said guide than on the side towards said guide, whereby said stack is caused to hug said guide, and trimming means arranged beyond said guide for trimming an edge of said stack, said trimming means consisting of a combined saw and milling trimmer for effecting a rough cut, and a milling trimmer arranged with its axis at right angles to the plane of said stack for effecting the finishing cut.

4. A veneer trimming machine comprising a pair of chains, a housing for the upper chain including side walls and an intermediate horizontal wall, a plurality of removable shoes in the housing adapted to engage the inner face of the bottom run of the chain, said shoes having longitudinal slots therein, retaining rods carried by the walls of the housing and extending through the slots, guide pins extending from the back of the shoes upwardly through openings in the horizontal wall for sliding movement therein, coil springs mounted upon the guide pins and disposed between the horizontal wall and the back of the shoes for normally retaining the shoes in contact with the bottom run of the chain.

In testimony that I claim the foregoing I have hereunto set my hand at Wabash, in the county of Wabash and State of Indiana.

FRANK DIEHL.